United States Patent [19]
Skaling

[11] Patent Number: 5,749,288
[45] Date of Patent: May 12, 1998

[54] DEVICE FOR HOME ROASTING OF COFFEE BEANS

[76] Inventor: Tim Skaling, 3538 Gird Rd., Fallbrook, Calif. 92028

[21] Appl. No.: 710,708

[22] Filed: Sep. 20, 1996

[51] Int. Cl.⁶ .............................. A47J 37/00; A23N 12/12; F26B 17/00
[52] U.S. Cl. .................. 99/483; 99/286; 99/476; 34/233; 34/360; 34/368; 34/394
[58] Field of Search ................. 99/286, 469–476, 99/483; 34/225, 233, 360, 576, 594, 394, 494, 368, 606, 589; 219/400; 426/466, 467

[56] References Cited

U.S. PATENT DOCUMENTS

| | | |
|---|---|---|
| 1,345,477 | 7/1920 | Cappelli . |
| 1,604,058 | 10/1926 | Mager . |
| 1,896,230 | 2/1933 | Farago . |
| 2,168,797 | 8/1939 | Havis ............................. 53/3 |
| 2,282,708 | 5/1942 | Dantzig ........................ 99/68 |
| 2,325,683 | 8/1943 | Kayden ......................... 53/3 |
| 2,325,684 | 8/1943 | Kayden ......................... 53/3 |
| 2,348,066 | 5/1944 | Goldfine ....................... 99/68 |
| 2,389,577 | 11/1945 | O'Toole et al. ............... 99/68 |
| 3,153,377 | 10/1964 | Bosak ........................ 99/280 |
| 3,964,175 | 6/1976 | Sivetz .......................... 34/57 |
| 4,196,342 | 4/1980 | Chailloux ................. 219/385 |
| 4,271,603 | 6/1981 | Moore, III .................. 34/181 |
| 4,325,191 | 4/1982 | Kumagai et al. ......... 99/286 X |
| 4,326,114 | 4/1982 | Gerling et al. .......... 219/10.55 |
| 4,425,720 | 1/1984 | Elevitch ..................... 34/233 |
| 4,455,763 | 6/1984 | Elevitch ..................... 34/233 |
| 4,484,064 | 11/1984 | Murray ..................... 99/469 X |
| 4,489,506 | 12/1984 | Brown et al. ................ 34/57 |
| 4,494,314 | 1/1985 | Gell, Jr. ..................... 34/368 |
| 4,591,508 | 5/1986 | Pultinas, Jr. ................ 426/595 |
| 4,642,906 | 2/1987 | Kaatze et al. ................ 34/13 |
| 4,698,916 | 10/1987 | Farber ........................... 34/57 |
| 4,737,376 | 4/1988 | Brandlein et al. ........ 426/467 |
| 4,860,461 | 8/1989 | Tamaki et al. .............. 34/68 |
| 4,871,901 | 10/1989 | Igusa et al. ................ 219/400 |
| 4,875,904 | 10/1989 | Munk ........................... 34/67 |
| 4,895,308 | 1/1990 | Tanaka ....................... 241/65 |
| 4,925,682 | 5/1990 | Miya ............................ 426/87 |
| 4,988,590 | 1/1991 | Price et al. ................ 426/595 |
| 5,083,502 | 1/1992 | Enomoto .................... 99/286 |
| 5,160,757 | 11/1992 | Kirkpatrick et al. ..... 426/466 |
| 5,185,171 | 2/1993 | Bersten .................... 426/467 |
| 5,230,281 | 7/1993 | Wireman et al. ............ 99/483 |
| 5,269,072 | 12/1993 | Waligorski ................ 34/594 |
| 5,359,788 | 11/1994 | Gell, Jr. ...................... 34/360 |
| 5,564,331 | 10/1996 | Song ........................ 99/476 X |

*Primary Examiner*—Timothy F. Simone
*Attorney, Agent, or Firm*—Limbach & Limbach LLP

[57] ABSTRACT

A coffee bean roaster for home use in which a fan heater assembly in a housing blows hot air upwardly through a glass roasting chamber. The hot air escaping from the top of the chamber may be selectively recycled into the housing to raise the roasting temperature to compensate for low levels in available electrical power.

4 Claims, 5 Drawing Sheets

DEVICE FOR HOME ROASTING OF COFFEE BEANS

BACKGROUND OF INVENTION

1. Field of Invention

This invention relates to coffee roasters and particularly to a coffee roaster which is simple and compact and can be manufactured sufficiently inexpensively that it can be sold for wide spread home use.

2. Description of the Related Art

A variety of coffee roasters have been designed and some have been designed with the intent of providing a compact roaster for home use. Examples of such roasters are shown in U.S. Pat. No. 4,698,916 and U.S. Design Pat. Nos. DES 282,618 and DES 284,538.

For the purpose of a home use roaster, it is desirable to have a transparent roasting chamber in which the beans are roasted in a fluidizing stream of hot air where the user can see the color change of the beans as roasting progresses. It is also desirable that the roaster collect chaff generated in the roasting process and that the roaster have a small removable roasting chamber permitting the roasted beans to be handled easily while they are hot. Additionally, it is desirable to have the roaster operated by an electrical interval timer.

It is desirable for such a product to be operated on normal home electrical current which provides a problem in having consistent operation in different situations in which the power supply voltage may vary between about 115 volts AC and 125 volts AC.

SUMMARY OF THE INVENTION

In accordance with this invention I provide a coffee roaster comprising:

A roaster for coffee beans and the like comprising:
  a housing having an air intake opening,
  a transparent roasting chamber mounted on the housing and having a perforated bottom for receiving heated air and an open top for permitting escape of air and chaff,
  an electrical heater and fan assembly mounted in the housing for taking air from inside the housing, heating the air and blowing the heated air upwardly through the perforated bottom of the roasting chamber to fluidize and roast beans in the chamber,
  a cover for the roasting chamber positioned to receive air and chaff discharged from the open top of the chamber, trap the chaff and discharge the chaff free heated air adjacent to the housing, and
  an adjustable flow control for recycling at least some of the heated air discharged from the cover to the inside of the housing to control the temperature of the air taken in by the heater and fan assembly.

I have found that variations in power supply voltage may be compensated for vary efficiently and economically by capturing heated air which is discharged from the roaster and recycling part of that air to the inlet of the fan heater combination in order to raise the temperature of the roasting air where the available power supply is operating near the lower end of the 115–125 volt range. This is done very effectively by discharging heated chaff free air from the roaster around the outside of the roasting chamber and providing a plurality of apertures with an adjustable baffle to capture the discharged air and return it into the housing where it will be recycled by the fan heater assembly.

BRIEF DESCRIPTION OF THE DRAWINGS

The preferred arrangement of the roaster of my invention is illustrated in the attached drawing in which.

DETAILED DESCRIPTION OF THE PREFERRED EMBODIMENT

Figure 1:
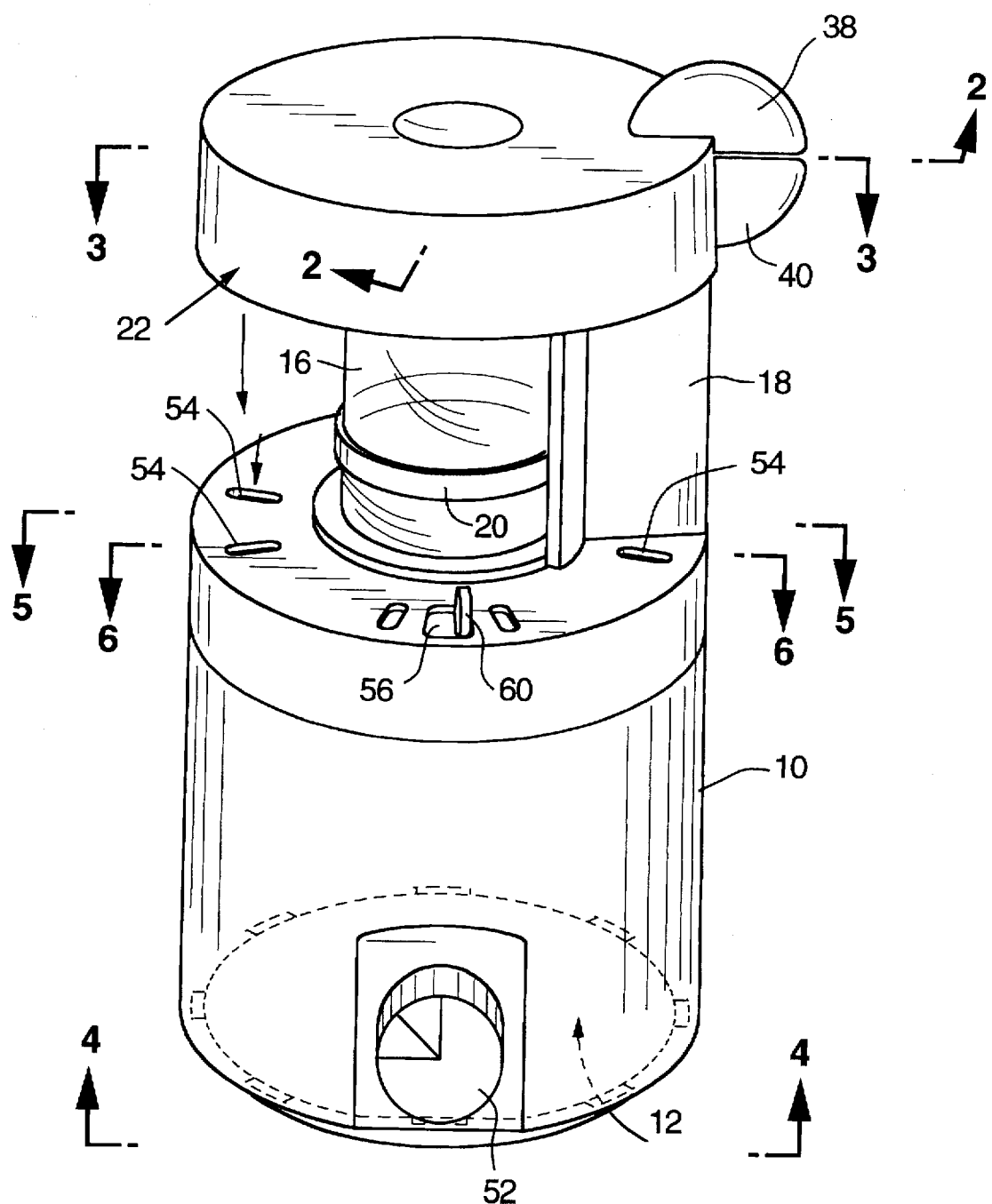
FIG. 1 is a perspective view of the assembled roaster.
Figure 2:
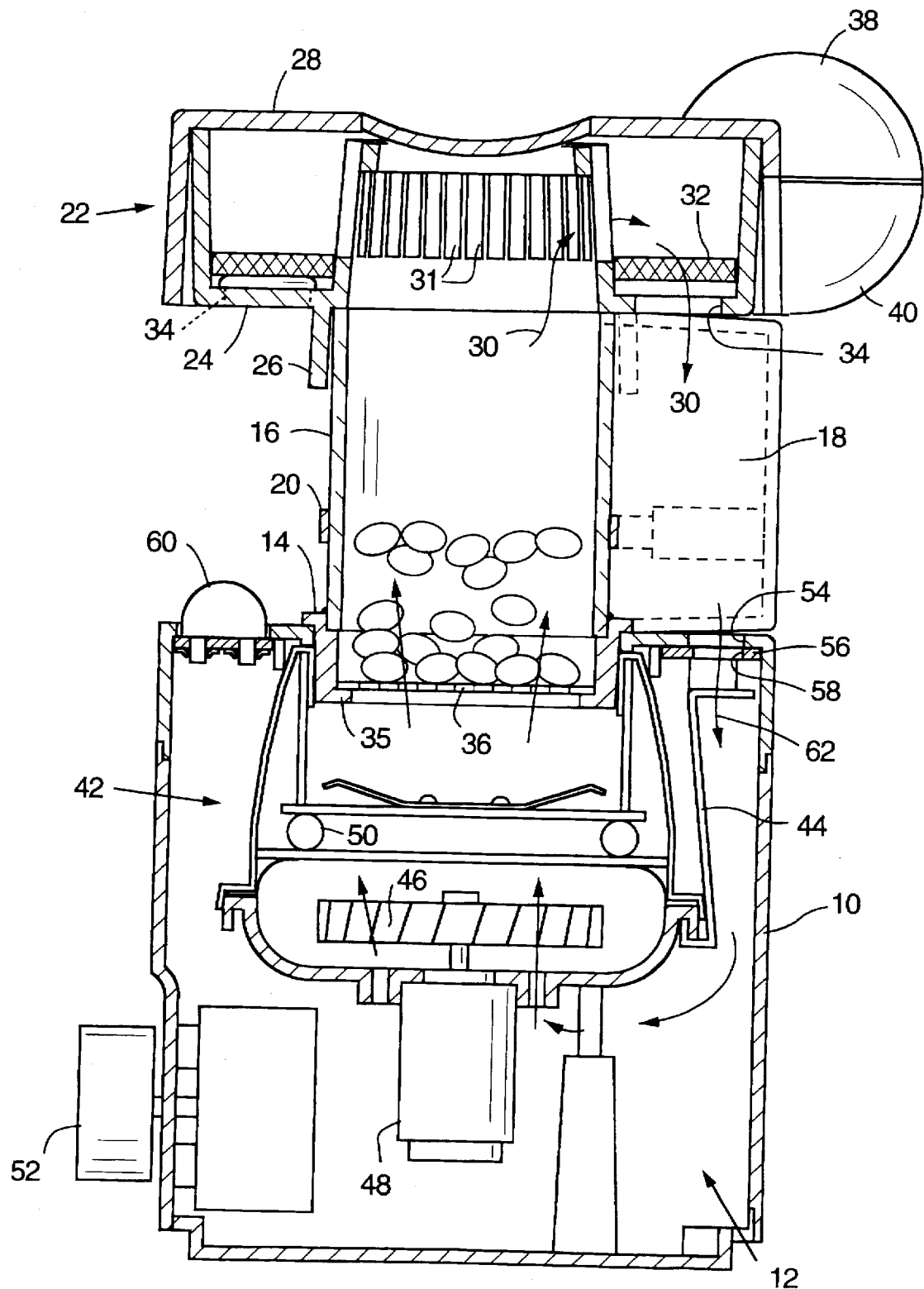
FIG. 2 is a vertical sectional view as indicated at 2—2 in FIG. 1.
Figure 3:
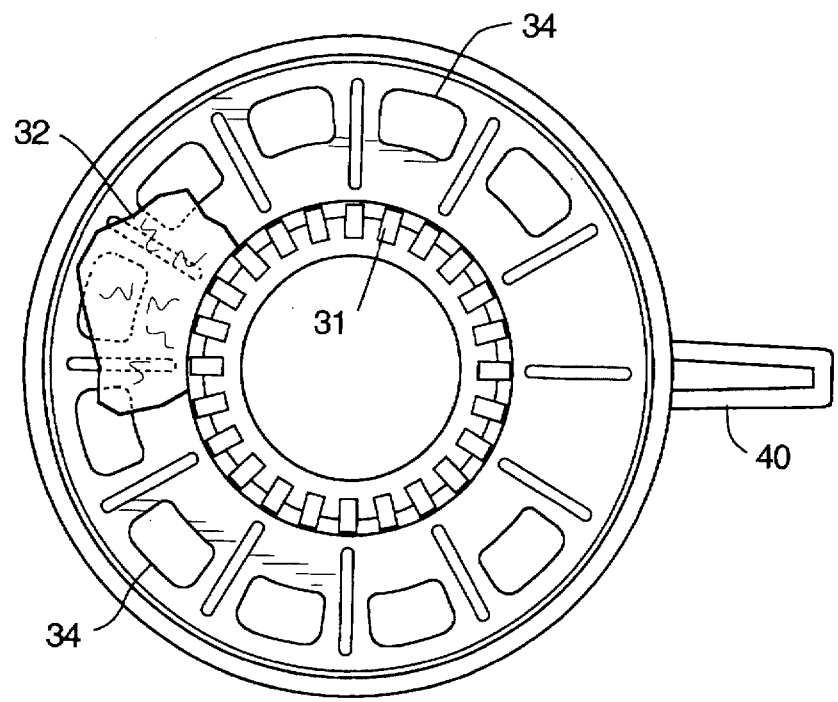
FIGS. 3, 4, 5 and 6 are cross sectional views is taken on the planes indicated in FIG. 1.
Figure 4:
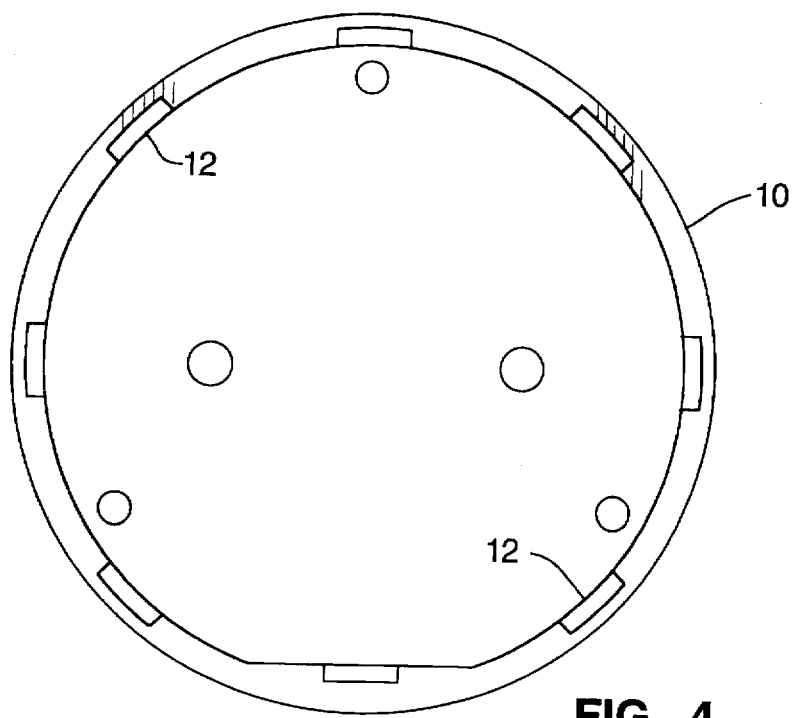
Figure 5:
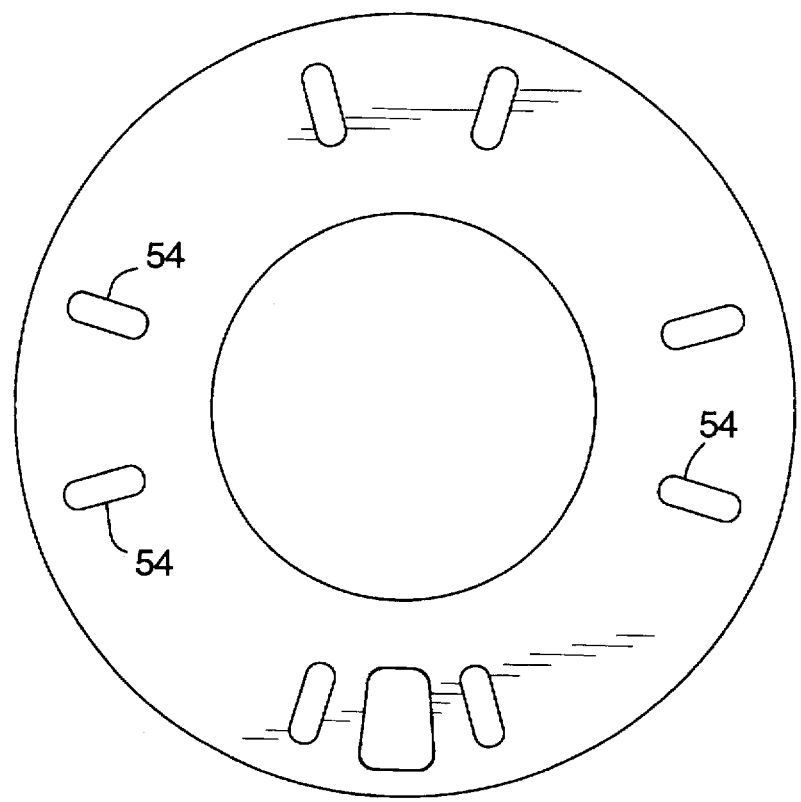
Figure 6:
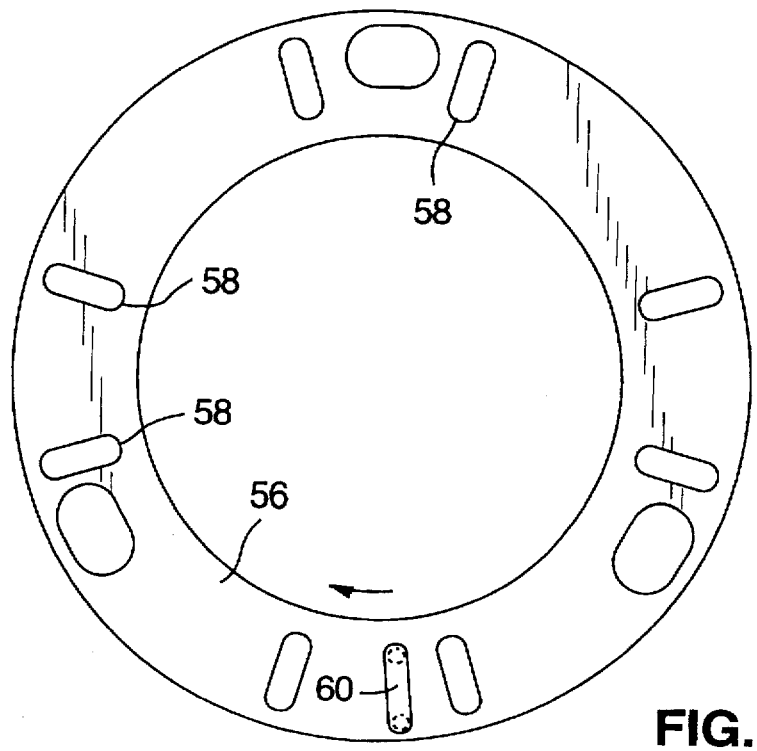
Figure 7:
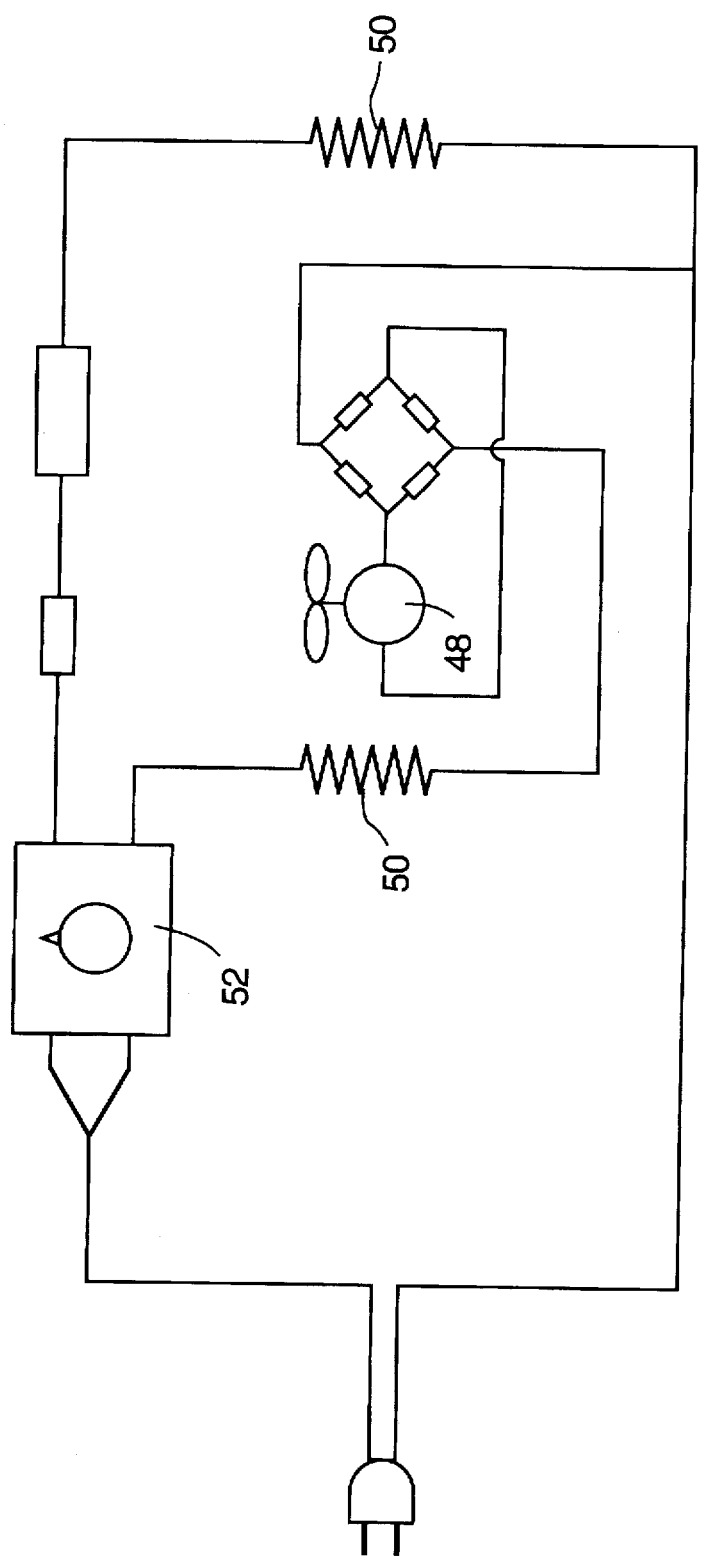
FIG. 7 is a diagram of a wiring circuit for the roaster.

The roaster includes a housing 10 having an inlet 12 for atmospheric air near the bottom of the housing where cool air entering the housing helps cool the bottom of the housing which may rest on the kitchen counter. The top of the housing has a cylindrical seat provided by a sleeve 14 which supports a glass roasting chamber 16. The roasting chamber is provided with a handle 18 secured to the chamber by a clamp ring 20.

A cover indicated generally at 22 is provided on the top of the roasting chamber. The cover has a lower member 24 with a flange 26 that fits over the open top of the roasting chamber and a top member 28 which inter fits with the flange 26 to provide an air discharge path 30 from the chamber, through passages 31 and a filter screen 32 and discharge openings 34 which discharge air downwardly around the outside of the chamber 16. An adapter ring 35 and a perforated screen 36 are attached to the bottom of the chamber 16 to support the roasted beans when the chamber is lifted out of the roaster. A pair of handle members 38 and 40 are provided on the upper and lower parts 28 and 24 respectively of the cover 22.

A fan heater assembly 42 is mounted in the housing supported from the upper part of the housing by a plurality of hangers 44. The fan heater assembly includes a fan 46 driven by an electric motor 48 and an electrical heater coil 50 with suitable support walls. The complete fan heater assembly provides a very economical sub assembly which may be obtained from the West Bend Company in West Bend, Wis. The preferred fan heater assembly is a standard assembly provided by West Bend Company for electrical popcorn machines.

The heating coils 50 and fan motor are controlled by an interval timer 52 which may be rotated from a home position to turn on the fan and heater for a time selected by the user depending upon the users choice of roasting intensity. The interval timer 52 turns the electrical heater coils 50 off one minute before turning the fan motor off to provide a cool down cycle.

The top of the housing 10 is provided with a plurality of openings 54 and a baffle 56 with a similar set of openings 58 is mounted to permit the openings 54 and 56 to be opened by moving an adjustment handle 60. The handle 60 may be moved to close the openings 54 and 56 so that the air taken in by the fan 48 is completely cool air entering the housing through opening 12. On the other hand, the handle 60 may be moved to open the openings 54 and 56 partially or completely so that hot air escaping from the cover along path 30 will be pulled into the housing along path 62 so that the temperature of the air taken in by the fan is higher than the temperature of the fresh air through opening 12.

What is claimed is:

1. A roaster for coffee beans comprising:

a housing having an air intake opening, a transparent roasting chamber mounted on the housing and having a perforated bottom for receiving heated air and an open top for permitting escape of air and chaff, an electrical heater and fan assembly mounted in the housing for taking air from inside the housing, heating the air and blowing the heated air upwardly through the perforated bottom of the roasting chamber to fluidize and roast beans in the chamber, a cover for the roasting chamber positioned to receive air and chaff discharged from the open top of the chamber, trap the chaff and discharge the chaff free heated air adjacent to the housing, and an adjustable flow control for recycling at least some of the heated air discharged from the cover to the inside of the housing to control the temperature of the air taken in by the heater and fan assembly with the adjustable flow control being adjustable while the heater is operating to adjust the temperature of air heated by the heater.

2. The roaster of claim 1 having an adjustable interval timer for turning on the fan and heater and for turning the heater off a predetermined time before turning the fan off.

3. The roaster of claim 1 in which the chamber is generally cylindrical, the housing has a cylindrical seat for removably supporting the bottom of the chamber, the cover has a cylindrical flange for engaging the open top of the chamber and supporting the cover on the chamber, and both the cover and the chamber are provided with handles for removing them from the housing and from each other.

4. The roaster of claim 1 in which the cover is provided with air discharge passages for discharging the heated chaff free air downwardly around the outside of the chamber, and the adjustable flow control comprises a plurality of passages into the housing surrounding the chamber in the path of the heated chaff free air and a movable damper for opening and closing the passages.

* * * * *